UNITED STATES PATENT OFFICE.

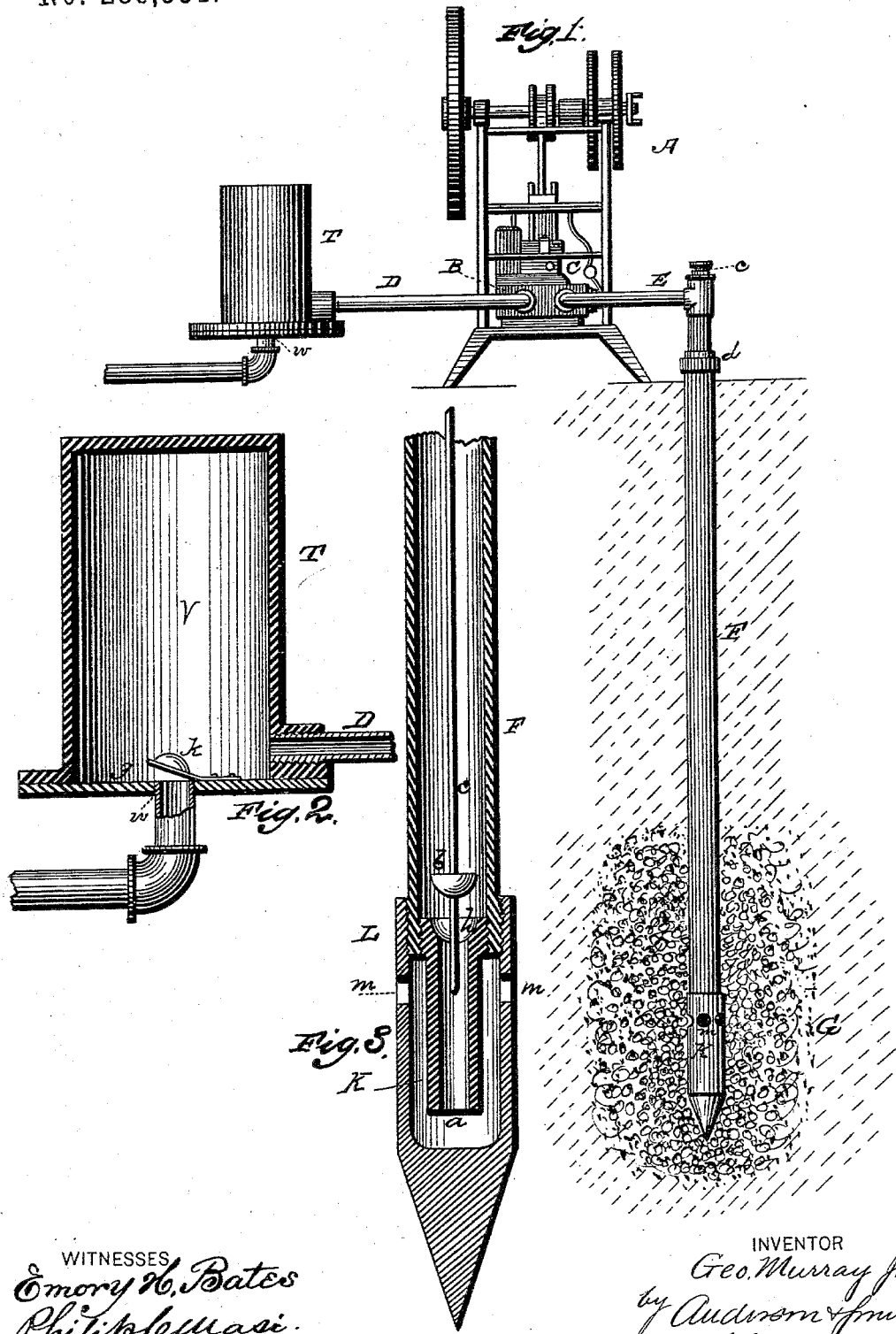

GEORGE MURRAY, JR., OF CAMBRIDGEPORT, ASSIGNOR OF ONE-HALF TO CHARLOTTE MORGAN, OF MELROSE, MASSACHUSETTS.

AIR-TRAP FOR WATER-ENGINES.

SPECIFICATION forming part of Letters Patent No. 286,551, dated October 9, 1883.

Application filed January 4, 1883. (No model.)

*To all whom it may concern:*

Be it known that I, GEORGE MURRAY, Jr., a citizen of the United States, residing at Cambridgeport, in the county of Middlesex and State of Massachusetts, have invented certain new and useful Improvements in Air-Traps for Water-Engines; and I declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side view of my device. Fig. 2 is a vertical sectional view of the water-trap T, and Fig. 3 is a vertical sectional view of the tube or dry well F.

This invention has relation to devices for facilitating the operation of water-engines; and it consists in providing the outlet with an air-trap of automatic character; and the invention further consists in the construction and novel arrangement, in connection with a water-engine, of a descending outlet having an automatic air-trap, and an inlet having a stop-valve and water-trap, all as hereinafter set forth.

In the accompanying drawings, the letter A designates a water-engine, whereof B is the valve-chest, and C the piston-cylinder.

D represents the inlet-pipe leading to the valve-chest, and E is the outlet-pipe leading therefrom. It is preferred that the outlet should be extended by means of a bored or artesian dry well, F, terminating in gravel, as indicated at G, so as to afford a free outlet under ground for the escaping water. A valve-seat, $h$, is made in the lower portion of the outlet above the air-trap K, which consists of a surrounding case, L, having perforations $m$ above the lower end of the outlet-extension $a$, which extends downward from the valve-seat. Water therefore will always stand in the case or cup L, and as the lower end of the outlet-pipe $a$ is immersed therein air cannot pass through the trap upward to the engine. The valve-seat $h$ is provided with a valve, $b$, the stem of which (indicated at $c$) extends upward through the cap $d$ of the outlet-pipe. When the valve $b$ is raised from its seat, the escaping column of water from the engine moves downward, and facilitates materially the action of the engine, adding to its power. When the valve is closed, the water is retained in the upper portion of the outlet, thereby preventing the engine from losing its priming.

The inlet D is provided with a water-trap, T, consisting of an air-chamber, V, into which the supply-pipe opens at $w$ in the bottom $g$. A check-valve, $k$, is provided at the mouth of the supply-pipe in the chamber V, and from the lower portion of the chamber the inlet extends to the valve-chest of the engine. The object of the air-chamber and its valve is to obviate the effect of the recoil of the water and to assist the action of the engine. When the check-valve closes, it prevents the backward movement of the water, and as the air in the chamber V is compressed when the main valve of the engine opens the water of the air-chamber is thrown into the cylinder with additional power. The air-chamber should be made of a little less capacity than the cylinder of the engine in connection with which it is designed to work.

Having described this invention, what I claim, and desire to secure by Letters Patent, is—

1. The combination, with the outlet of a water-engine, of the air-trap K in the lower portion thereof and the stop-valve $b$ above said trap, substantially as specified.

2. The combination, with a water-engine, of an outlet extending downward into the ground, and provided with an automatic air-trap, K, and a stop-valve above said air-trap, substantially as specified.

3. The combination, with a water-engine, of a descending outlet having an automatic air-trap, K, and stop-valve $b$, and an inlet having a water-trap, T, and check-valve $k$, substantially as specified.

In testimony whereof I affix my signature in presence of two witnesses.

GEORGE MURRAY, JR.

Witnesses:
WM. BURGESS,
W. B. CHILD.